United States Patent [19]

Yi

[11] 4,280,530
[45] Jul. 28, 1981

[54] WATER-FLOW-CONTROL DEVICE

[76] Inventor: Kon H. Yi, 22941 Aspan St., El Toro, Calif. 92630

[21] Appl. No.: 109,809

[22] Filed: Jan. 7, 1980

[51] Int. Cl.³ .................................... F16K 31/48
[52] U.S. Cl. ........................... 137/624.11; 222/20; 137/599.1; 239/68
[58] Field of Search ............... 137/624.11, 624.12, 137/624.14, 599, 599.1; 239/68; 222/20; 251/15, 16

[56] References Cited

U.S. PATENT DOCUMENTS

| 1,775,293 | 9/1930 | Pfening | 222/20 |
| 3,097,762 | 7/1963 | Charnota | 222/20 |
| 3,169,666 | 2/1965 | Rinkewich | 222/20 |
| 3,187,570 | 6/1965 | Mueller | 137/599.1 X |
| 3,810,562 | 5/1974 | Clarke | 222/20 |
| 4,180,099 | 12/1979 | Moore | 137/624.11 X |
| 4,202,467 | 5/1980 | Rutten | 122/20 |

Primary Examiner—Alan Cohan

Attorney, Agent, or Firm—Francis X. LoJacono

[57] ABSTRACT

A water-flow-control device adapted to be positioned within water systems which are generally used for watering lawns and gardens, as well as for distributing water over larger areas of land such as for agricultural use, whereby the device permits a predetermined amount of water to be discharged in a positive and accurate manner in accordance with the time period for which the device is set, the device comprising a housing having an inlet-flow chamber and an outlet-flow chamber, wherein the inlet chamber includes an impeller and the outlet chamber includes a hinged flow-valve member which closes under both spring action and water pressure, the two chambers being interconnected by a flow passage which is provided with a pressure-release valve. A timing device is connected to the flow valve and is operated by the impeller, the impeller having a mechanism whereby the rate of water flow can be controlled from a low to high range.

4 Claims, 7 Drawing Figures

WATER-FLOW-CONTROL DEVICE

BACKGROUND OF THE INVENTION

1. Field of the Invention

This invention relates generally to a water-flow control device, and more particularly to a water-flow control device that is provided with both a timing device and a flow control mechanism that allows for specific amounts of water to flow during a predetermined time period.

2. Description of the Prior Art

As is well known in the art, various problems and difficulties are encountered in providing suitable means for controlling water flow for irrigation purposes, or for simply watering the home garden or lawn.

Very often one wishes to not only control the timing of a water cycle, but in addition to control the amount of water flow as well. For example, under certain conditions a large volume of water might be required for a specific length of time; while under other conditions such as for watering gardens or lawns one might wish to dispense the water in smaller quantities for a comparable length of time.

Several types of devices for controlling the flow of water in sprinkling and irrigation systems have been used, and some are presently still in use. However, these devices have features that restrict their use, or their placement, and are also complicated to operate and expensive to maintain.

Various arrangements of water-flow-control valves are disclosed in a number of issued U.S. patents.

U.S. Pat. No. 1,812,586 to D. Elder provides an apparatus for controlling the passage of water to sprayers and the like.

U.S. Pat. No. 2,545,928 to G. K. Martin et al is a device which will automatically shut off the water being delivered therethrough after the desired amount has been discharged. However, this device does not include a volume-flow control so as to augment its use.

A metering and timing controller for sprinkling systems is disclosed in U.S. Pat. No. 2,642,076 to C. R. Tigert et al. This device provides a control which will successively turn on and then turn off each of a series of branch lines of a sprinkling system.

Additional U.S. patents that should be noted are U.S. Pat. Nos. 2,675,817 to L. C. Hartlett, Sr., for AUTOMATIC SPRINKLER CONTROL MECHANISM; 2,781,050 to G. Edwards, for LIQUID FLOW CONTROL VALVE; 3,089,651 to R. P. Skerritt, for LAWN SPRINKLER WITH TIMED AUTOMATIC SHUTOFF; and 3,529,618 to I. Rinkewich, for IRRIGATION SYSTEM.

There is still a particular need for a water-flow control unit that can be employed in home lawns and gardens, etc., wherein a simple control unit can be inserted in an existing water system, thus solving the watering problems of most homeowners, caretakers, etc., who want to prevent the unnecessary use of water.

SUMMARY AND OBJECTS OF THE INVENTION

The present invention comprises a water-flow-control device which includes means for providing a timing controller for the water to be discharged, together with a volume-flow-control mechanism. The water-flow-control device comprises a housing having an inlet chamber which includes an impeller that operates a timing device which is set for a specific discharge period. A main flow valve is operably connected to the timing device, the flow valve being positioned in an outlet chamber and the impeller being positioned upstream therefrom. The impeller is arranged to be controlled so as to regulate the flow volume through the inlet chamber, the water therefrom passing through a communicating passage disposed between the inlet and outlet chambers. Included within the communicating passage is a pressure-relief-valve mechanism that allows the water pressure against the main valve to be diverted around the valve, whereby the valve can be manually opened. Once the valve is opened and the timing device is set, the pressure-relief valve is rotated to allow water to flow through the communicating passage into and out of the outlet chamber, so that the water is dispensed in a controlled manner within any given water-discharge system—such as, for example, in a sprinkler system employed in a home lawn, etc.

The present invention has for an important object a provision wherein an impeller positioned in an inlet chamber is so arranged as to control both the timing mechanism of the device, and the volume of water to be discharged as well.

It is another object of the invention to provide a water-control-flow control device of this character that includes a main valve arranged to have a positive closed position, whereby the valve is held closed under spring tension and under water pressure, and whereby the valve cannot be inadvertently opened against the water pressure.

It is still another object of the invention to provide a control device of the character that further includes a means to by-pass the water pressure from the outlet chamber to atmosphere or to a point downstream of the main valve.

A still further object of the invention is to provide a water-flow-control device with an easily adjustable control valve.

It is a further object of the invention to provide a device of this character having relatively few operating parts.

It is still a further object of the invention to provide a device to control water flow that is easy to install, service and maintain.

Still another object of the invention is to provide a device of this type that is relatively simple and rugged in construction, and is inexpensive to manufacture.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only.

DESCRIPTION OF THE PREFERRED EMBODIMENT

Figure 1:
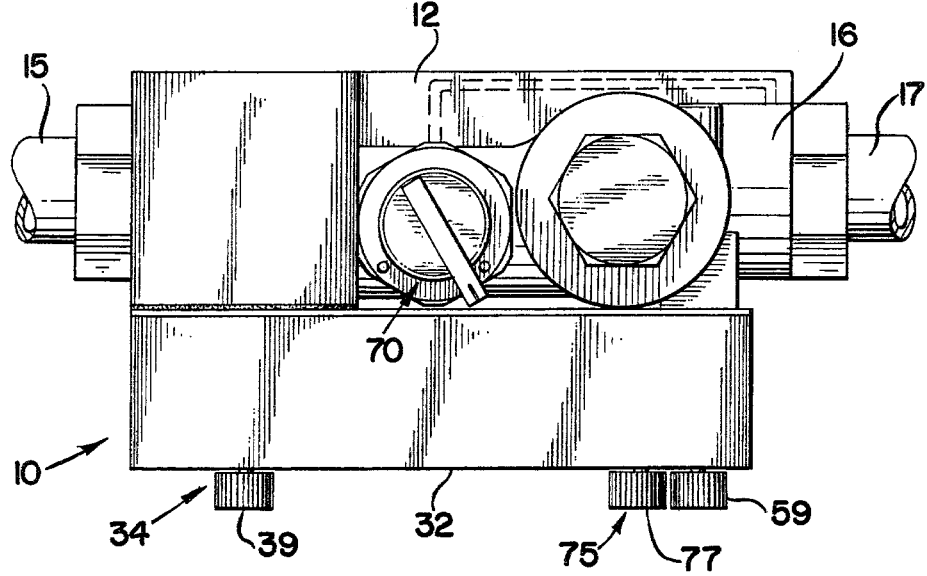
FIG. 1 is a top-plan view of the present invention showing the pressure-relief valve in a fully operating position.
Figure 2:
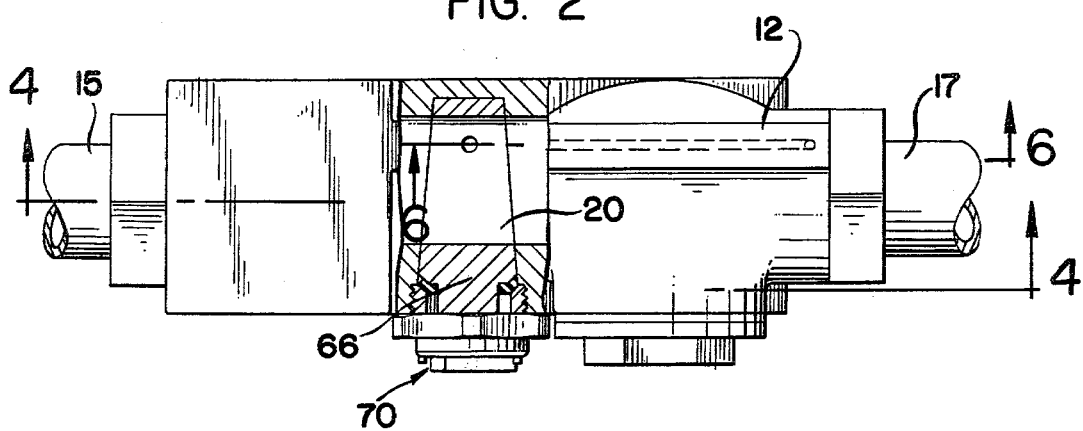
FIG. 2 is a rear-elevational view wherein a portion of the housing is shown broken away to illustrate the flow passage having the pressure-relief valve positioned therein.
Figure 3:
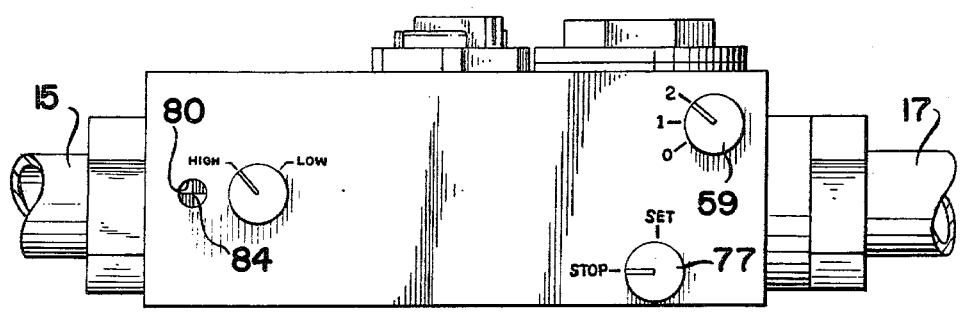
FIG. 3 is a front-elevational view of the device showing the various adjusting knobs to control the volume flow and the timing.
Figure 4:
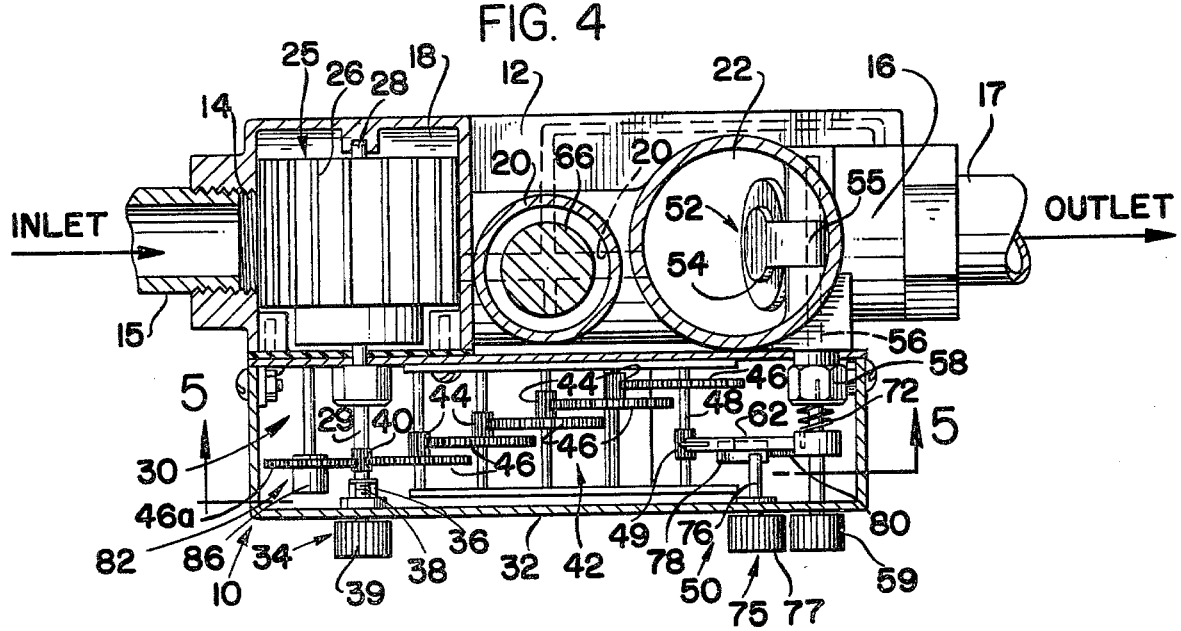
FIG. 4 is a longitudinal cross section taken substantially along line 4—4 of FIG. 2.

Referring more particularly to the drawings, there is shown a water-flow-control device, generally indicated at 10, comprising a main housing 12 having an inlet port 14 at one end thereof, and an outlet port 16 at the opposite end thereof, said ports 14 and 16 being adapted (such as by internal threads) to receive conduits or pipes 15 and 17, respectively.

Inlet port 14 communicates with an inlet-flow chamber 18 wherein water is received from pipe 15 and flows through chamber 18 into a communicating passage 20, said passage being positioned to connect the inlet chamber 18 with an outlet chamber 22. Outlet chamber 22 also includes a valve seat 24 which is interposed between outlet port 16 and chamber 22.

There is provided within inlet chamber 18 a water operated drive means which is also arranged to establish a water volume-control means, both means being indicated generally at 25. Each of the above means comprises an impeller 26 rotatably supported in inlet chamber 18, wherein the incoming force of water causes the impeller to rotate, the water then passing into passage 20. The volume-flow-control means includes a shaft 28 journaled in housing 12; and it has one end thereof extending outwardly into the gear-train compartment 30 which is defined by cover 32. The extended portion 29 of shaft 28 is arranged to be engaged by a means to adjust the rotational speed of the impeller, which in turn controls the flow of water between inlet port 14 and passage 20. The speed-adjusting means, generally indicated at 34, comprises a flexible spring plate 36 secured to cover 32 and movable by engaging-screw member 38 which is threadably mounted to cover 32, said screw having a knob 39 whereby screw 38 can be rotated inwardly or outwardly. Thus, the inward movement of screw 38 forces plate 36 against the outer free end of shaft 28, providing friction therebetween. Hence, the more friction is applied to shaft 28, the slower the impeller will rotate—thereby slowing the flow of water entering chamber 18. Accordingly, as screw 38 is disengaged from plate 36, pressure is released from shaft 28 and impeller 26 will freely rotate as rapidly as the incoming flow of water will allow.

The related drive means comprises impeller 26 and shaft 28, shaft 28 including a pinion gear 40 secured to the freely extended shaft end 29, and pinion gear 40 being positioned to engage and drive a gear-train assembly, generally indicated at 42. The gear-train assembly can have any suitable arrangement so as to provide a timed rotational output. Gear-train assembly 42 herein shown comprises a plurality of small cog wheels 44 with respective larger gears 46 to form a gear train. Pinion gear 40 engages the gear train at the input end; and the output end includes shaft 48 having an output-drive pinion gear 49. Pinion gear 49 is so positioned thereon as to engage with a valve-timing means, generally indicated at 50, which will hereinafter be described in detail.

Figure 7:
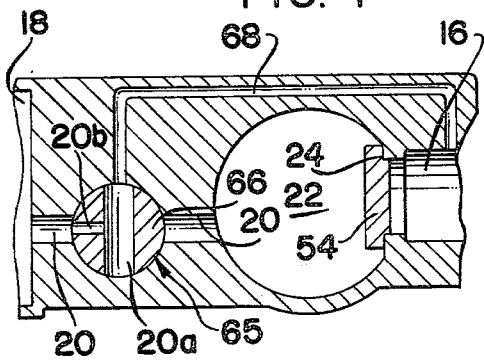
FIG. 7 is a similar view showing the pressure-relief valve rotated ninety degrees, diverting the water around the outlet chamber.
Figure 6:
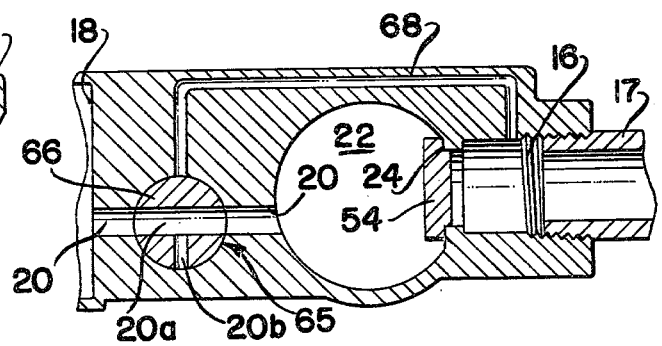
FIG. 6 is a cross-sectional view taken substantially along line 6—6 of FIG. 4 showing the pressure-relief valve in an open position and allowing water to enter the outlet-valve chamber.

Referring again to outlet chamber 22, there is included therein a valve means 52 which comprises a valve member 54 that is hingedly mounted at 55 within chamber 22, the valve—when closed—engaging valve seat 24 as seen in FIGS. 6 and 7. Valve member 54 is operated by timing means 50 which comprises a pin 56 rotatably mounted in housing 12, valve member 54 being affixed thereto so as to rotate therewith. Pin 56 extends outwardly from housing 12 through bushing 58 and cover 32, the free end thereof being adapted to receive a knob 59.

Timing means 50 is also operably mounted to pin 56, said means comprising a crescent-shaped gear member 60 arranged to mesh with pinion gear 49. Crescent gear 60 is spring-biased in order to engage pinion gear 49 by means of a flexible arm member 62, which is affixed at one end to pin 56 by sleeve 63 and affixed at the opposite end to crescent gear 60. A biasing leaf spring member 64 is interposed between gear 60 and sleeve 63, whereby gear 60 can be moved out of engagement with pinion gear 49 when the timing means is to be released and valve 54 is to be manually closed. Thus, any rotational movement of pin 56 will cause gear 60 to move about an arc; and any movement of gear 49 will cause pin 56 to rotate.

Figure 5:
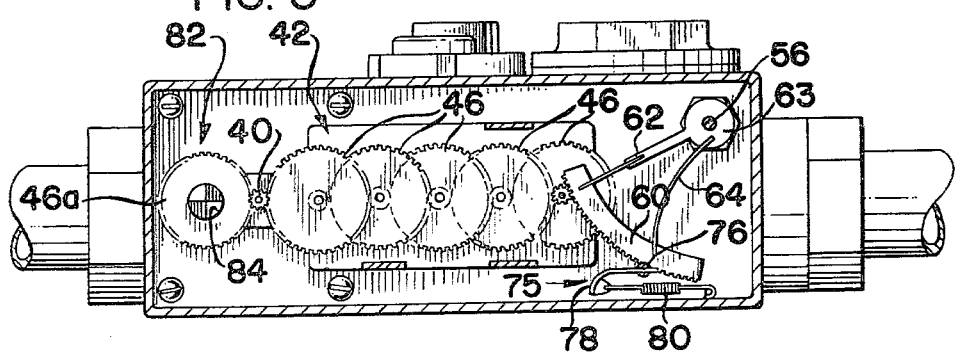
FIG. 5 is a cross-sectional view taken substantially along line 5—5 of FIG. 4 showing the timer-gear assembly.

When valve 54 is in a closed mode as seen in FIG. 6, crescent gear member 60 is positioned as seen in FIG. 5. Hence, no flow of water through pipe 17 is possible. In order to open valve 54 to provide an operating flow from pipe 15 to pipe 17, water pressure within chamber 22 must be reduced. That is, when valve 54 is in a closed mode after a normal operation, water pressure is still established within chamber 22 because of the open passage 20. Therefore, a pressure-release means is required, as indicated at 65, whereby fluid pressure is diverted from chamber 22.

The pressure-release means comprises a rotor-diverter valve 66 which is positioned across the flow path of passage 20, and a by-pass passage 68 that extends from diverter valve 66 to a point downstream of valve 54. Passage 68 can also be vented to atmosphere; but this is not considered the preferable form.

Diverter valve 66 includes a passage 20a and a secondary release passage 20b, passage 20a being normally aligned with passage 20 to allow flow between chambers 18 and 22, respectively. Since secondary passage 20b is positioned at right angles to passage 20a, passage 20a will be in a closed-off position as seen in FIG. 6. In order to release water pressure in chamber 22, valve 65 is rotated clockwise a quarter turn to ninety degrees, and is regulated by stop means 70. As seen in FIG. 7, release passage 20b is aligned with the inlet side of passage 20; and thus water pressure is diverted from passage 20b and passage 20a into release passage 68, where it is discharged into outlet port 16.

At this time, knob 59 is rotated clockwise against a counter-clockwise biasing spring 72. Due to the cooperating arrangements between flexible arm 62 and leaf spring 64, the clockwise movement of crescent gear 60 will allow gear 60 to slip over pinion gear 49; and thus valve 54 can be positioned at any degree—from fully closed to fully opened. Once valve 54 is opened to a selected position, diverter valve 66 is rotated counter clockwise, again aligning passage 20a with passage 20 and allowing water to flow into chamber 22 through outlet port 16.

Accordingly, as water flows therethrough, impeller 26 is rotated at a speed set by speed-adjusting means 34. Rotational movement is imparted to the gear-train system 42 operably connected to crescent gear 60 which is rotated in a counter-clockwise direction, thus causing valve 54 to close on seat 54 and thereby preventing further flow of water from being discharged therethrough.

During the open mode, when water is flowing, valve 54 can be manually closed by overriding the gear-train system. This is accomplished by providing a gear-release means 75 that comprises a shaft 76 supported in cover 32 having a knob 77 affixed to one end for rotation thereof, and a leg member 78 secured to the inner end of shaft 72 so as to rotate into engagement with crescent gear 60. When knob 77 is rotated, leg 78 pushes crescent gear 60 out of contact with pinion gear 49, whereby gear 49 will retract to a closed position (as seen in FIG. 5) and thereby closing valve 54 by means of spring 72. Leg 78 is also returned to a normal disengaged position by means of coil spring 80.

There is further provided an operating-indicator means whereby the flow of water is indicated. This means is designated generally at 82 and comprises a shaft 84 having a gear 46a adapted to engage pinion gear 40 of shaft 28. Gear 46a is provided with a marker wheel 86 that rotates as pinion gear 40 rotates. This marker wheel is seen through opening 88 in cover 32. Thus, when one can see that the marker wheel is rotating, he knows that the device is operating.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A water-control device adapted for use in water systems wherein the volume of water flow and the timing of the flow is required, said device comprising:
   a housing having an inlet port and an outlet port;
   an inlet chamber communicating with said inlet port;
   an outlet chamber communicating with said outlet port;
   an interconnecting flow passage interposed between said inlet chamber and said outlet chamber;
   means for controlling the volume of water passing between said inlet chamber and said outlet chamber;
   drive means within said inlet chamber operated by the water flow through said inlet port;
   a gear-train system operably connected to the drive means;
   a valve means operably mounted within said outlet chamber;
   a valve-timing means operably interposed between said valve means and said gear-train system, wherein said valve-timing means comprises a gear member adapted to be disengageable from said gear-train system for setting the length of time between an opened or closed position of the valve means;
   and wherein said valve means comprises:
   a valve seat interposed between said outlet chamber and said outlet port;
   a valve member hingedly mounted within said outlet chamber;
   a shaft connected to said valve member and extending outwardly from said housing, said timing means being affixed to said valve shaft so as to rotate therewith; and
   a spring biasing means mounted to said shaft to bias said valve member and said timing means in counter-clockwise rotation;
   means for releasing water pressure against said valve means when in a closed position, said release means being positioned in said interconnecting flow passage;
   a diverter passage adapted to selectively communicate between said interconnecting passage and the downstream side of said valve means;
   said gear member of said timing means being formed in a crescent shape, and being flexibly attached to said valve shaft by a flexible arm member and a flexible leaf spring;
   and wherein means is provided for releasing said crescent-shaped gear member from engagement with a gear of said gear-train system, whereby said valve member can be returned to a closed position.

2. A water-control device adapted for use in water systems wherein the volume of water flow and the timing of the flow is required, said device comprising:
   a housing having an inlet port and an outlet port;
   an inlet chamber communicating with said inlet port;
   an outlet chamber communicating with said outlet port;
   an interconnecting flow passage interposed between said inlet chamber and said outlet chamber;
   means for controlling the volume of water passing between said inlet chamber and said outlet chamber;
   drive means within said inlet chamber operated by the water flow through said inlet port;
   a gear-train system operably connected to the drive means;
   a valve means operably mounted within said outlet chamber;
   a valve-timing means operably interposed between said valve means and said gear-train system; and
   means for releasing water pressure against said valve means when in a closed position, said release means being positioned in said interconnecting flow passage;
   a diverter passage adapted to selectively communicate between said interconnecting passage and the downstream side of said valve means;
   wherein said means for releasing water pressure comprises a diverter valve having a through passage adapted to be aligned with said interconnecting passage during water flow between said inlet and outlet chambers, a secondary passage being formed at right angles to said through passage and positioned in said inlet chamber to said diverter passage when said through passage is rotated ninety degrees from its aligned position; and wherein said drive means comprises:
an impeller rotatably mounted within said inlet chamber interposed between said inlet port and said interconnecting flow passage;
an impeller shaft journaled in said housing and extending outwardly therefrom for driving engagement with said gear train system; and
a speed-adjusting means adapted to engage said impeller shaft to control the rotational speed of said impeller, thereby controlling the flow of water entering said flow passage.

3. A device as recited in claim 2, wherein said device includes an operating-indicator means operably connected to said drive means, whereby water flow through said device is visually indicated.

4. A device as recited in claim 2, wherein said means for releasing said water pressure includes a stop means to prevent rotational movement of said diverter valve by more than ninety degrees.

* * * * *